(12) United States Patent
Hara

(10) Patent No.: US 6,571,250 B1
(45) Date of Patent: May 27, 2003

(54) METHOD AND SYSTEM FOR PROCESSING QUERIES IN A DATA PROCESSING SYSTEM USING INDEX

(75) Inventor: Norihiro Hara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 425 days.

(21) Appl. No.: 09/651,102

(22) Filed: Aug. 30, 2000

(30) Foreign Application Priority Data

Mar. 31, 2000 (JP) ........................................ 2000-101211

(51) Int. Cl.$^7$ .............................................. G06F 17/30
(52) U.S. Cl. ........................................... 707/101; 707/3
(58) Field of Search .................. 707/1–6, 10, 100–104; 709/227, 228

(56) References Cited

U.S. PATENT DOCUMENTS 6,175,835 B1 * 1/2001 Shadmon ..................... 707/102

OTHER PUBLICATIONS

Jim Gray, et al., "Transaction Proceedings: Concepts and Techniques", Morgan Kaufmann Publishers, 1993, pp. 851–886.
Sybase, Sybase Adaptive Server Enterprise Performance and Turning Guide, ASE 12, 1999, pp. 4–10 to 4–11.

* cited by examiner

Primary Examiner—John Breene
Assistant Examiner—Mohammad Ali
(74) Attorney, Agent, or Firm—Antonelli, Terry, Stout & Kraus, LLP

(57) ABSTRACT

When a data pointer relating to a key is added or deleted, a first log record containing information for addition or deletion of the data pointer to or from a data structure storing a plurality of data pointers relating to the key is obtained. An index entry containing the key stored in a leaf node is updated. A second log record containing the information that the data pointer has been added or deleted to or from the data structure is obtained. The data pointer is added or deleted to or from the data structure.

12 Claims, 10 Drawing Sheets

METHOD AND SYSTEM FOR PROCESSING QUERIES IN A DATA PROCESSING SYSTEM USING INDEX

BACKGROUND OF THE INVENTION

The present invention relates to a data management technology, and more particularly to an effective technology applied for management of plural pieces of data for an index key.

Recently, with the strong propagation of work systems operable through Internet, applications of database management systems (DBMS) supporting the systems are proceeding on a widening front. In this connection, the amount of data processed by the DBMS is increasing year by year. In the systems, a number of applications use a B-tree index which is a typical and the highest-speed retrieval means for the DBMS on the data having a narrow range of values such as 'work transition state', etc. in a work flow. Thus, the stable performance of the B-tree index becomes very important.

The B-tree index is disclosed by, for example, the document (Jim Gray and Andreas Reuter, Transaction Processing: Concepts and Techniques, Morgan Kaufmann Publishers, 1993) basically about the data structure, the concurrent accessing method from a plurality of processes, and the basic system for recovery.

To realize a high-speed B-tree index as a practical system, the following problems have to be solved.

(i) Improving the Concurrent Executability of Plural Processes

A problem occurs when a plurality of transactions simultaneously access a database table containing records. Practically, when a transaction tries to update a record, and when another transaction simultaneously tries to access the same record, a conflict occurs. One of the solutions to the conflict is a locking system (exclusive access system) for a portion (the entire B-tree index, a node, an index entry, a key value, etc.) of a record or a B-tree index. In the locking system, a transaction is forced to obtain a lock before accessing data. If a lock has already been obtained by another transaction, there arises a conflict for a lock, and a necessary lock may not be obtained. Although the locking system guarantees an update result and a reference result of the current transaction, it keeps the access of a transaction waiting until another transaction which has previously obtained a lock releases the lock. Therefore, it is important to minimize the number of locks simultaneously obtained by one transaction and the range (granularity) of the influence of the lock to improve the multiplicity (concurrency) of the system and throughput.

(ii) Recovery Process Control

In an actual system, it is necessary to guarantee the atomicity of a transaction, and the consistency of the data in the B-tree index in case of various failures such as an interruption of a transaction, a system failure, a medium failure, etc. To attain this, a log record obtaining system and recovery process control using a log record are important. A log record obtaining system can be a physical log system in which a physical image before and after an update of the node forming an index is obtained according to log record information. In the recovery process performed using a physical image, access to a page for other transaction is limited until a transaction completes update. That is, the recovery process control closely relates to exclusive control, and also affects concurrent executability.

FIG. 11 shows a structure of a conventional typical B-tree index.

A B-tree index can be set such that a number of nodes at various levels are branched from a root node. An end node in the branched nodes is referred to as a leaf node. Nodes other than the leaf node including the root node are referred to as upper nodes. Each node has a plurality of index entries each comprising the following information. An index entry in a leaf node is configured by a pointer to a record (table data) in a database, and a key value indicating one of the features of the record (table data). An index entry in an upper node is configured by a pointer to a node (child node) at a level immediately below, and a key value indicating the range of the key value managed finally by the leaf node branched from the child node. The key value in an upper index entry functions as a sign (determination element) when an access program to a B-tree index traces the path from the root node to the leaf node in which an index entry containing a pointer to a target record is stored and managed. Normally, a node in a B-tree index is realized by a page as an access unit in a database.

SUMMARY OF THE INVENTION

One of the exclusive control systems for a B-tree index can be a key value exclusive system or a key range exclusive system using the granularity of the exclusive resources of an index as a 'key'. When the exclusive control of an index key is performed, the retrieving and updating process on the data (rows) having the same key are serialized by index key exclusive control, thereby lowering the concurrency. A transaction processed in a WEB environment which has recently been more and more popular is larger than a transaction of a conventional OLTP, and it is difficult to provide a high-throughput service in an exclusive control system on a key.

As shown in FIG. 11, there are the following problems with the B-tree index having a number of same keys. In the B-tree index shown in FIG. 11, table data information relating a key is managed by one leaf entry 16. The leaf entry 16 includes a key 14, table data information 18 (data record identifier) relating to the key value, and a number 17 (number of duplication) of pieces of table data information 18 relating to the key value. The table data information 18 is arranged in an ascending order in a list form of duplication. In this storage system, when the number of duplication of a key increases, the length of a leaf entry cannot be stored in a leaf node 12. As a result, the table data information for one key has to be divided into a plurality of leaf entries, and stored in a plurality of nodes. In the example shown in FIG. 11, the entries of the keys '28' are stored separately in three nodes, that is, leaf nodes N4, N5, and N6. In this structure, the entries of the keys '28' are bottlenecks in scanning leaf nodes using a pointer in the horizontal direction corresponding to the range search. Furthermore, the key 14 contained in an upper node 13 stored in the root node 10 and the upper node 13 has also to be a key in the table data information in addition to '28', thereby causing the problem that the number of a root node 10 and the upper node 13 increases. As a result, a duplicate key lowers not only the performance of the access process on a duplication key itself, but also the access performance of the entire B-tree index, and the storage efficiency.

Gray discloses a method of managing table data information with the data structure other than the B-tree index, but does not disclose a method for concurrent execution control and recovery control. Furthermore, a recovery process system using a physical log is disclosed, but the above mentioned concurrent execution cannot be realized on the same page. These problems normally occur when index access is tried on the same key.

The object of the present invention is to solve the above mentioned problems, and provide a technology of performing index access on the same key in an environment where a plurality of access processing operations are performed.

The above mentioned problems are solved by the following means.

The problems are solved in an environment where a plurality of users gain access, and in a method for managing a B-tree index having a number of the same keys, with the data structure with which a plurality of data pointers relating to a key are stored, which is different from that of the leaf node storing an index entry containing the key, and in which data can be pointed to from an index entry containing the key to realize concurrent access in a plurality of processes. When a data pointer relating to a key is added or deleted, the first log record containing the information about adding or deleting the data pointer to or from the data structure storing the plurality of data pointers relating to the key is obtained, an index entry containing the key stored in a leaf node is updated, the second log record containing the information that the data pointer has been added or deleted to or from the data structure is obtained, and the data pointer is added or deleted to or from the data structure.

DESCRIPTION OF THE EMBODIMENTS

Described below is the database process system capable of efficiently accessing an index using the same key in a simultaneous access environment from a plurality of users according to an embodiment of the present invention.

Figure 1:
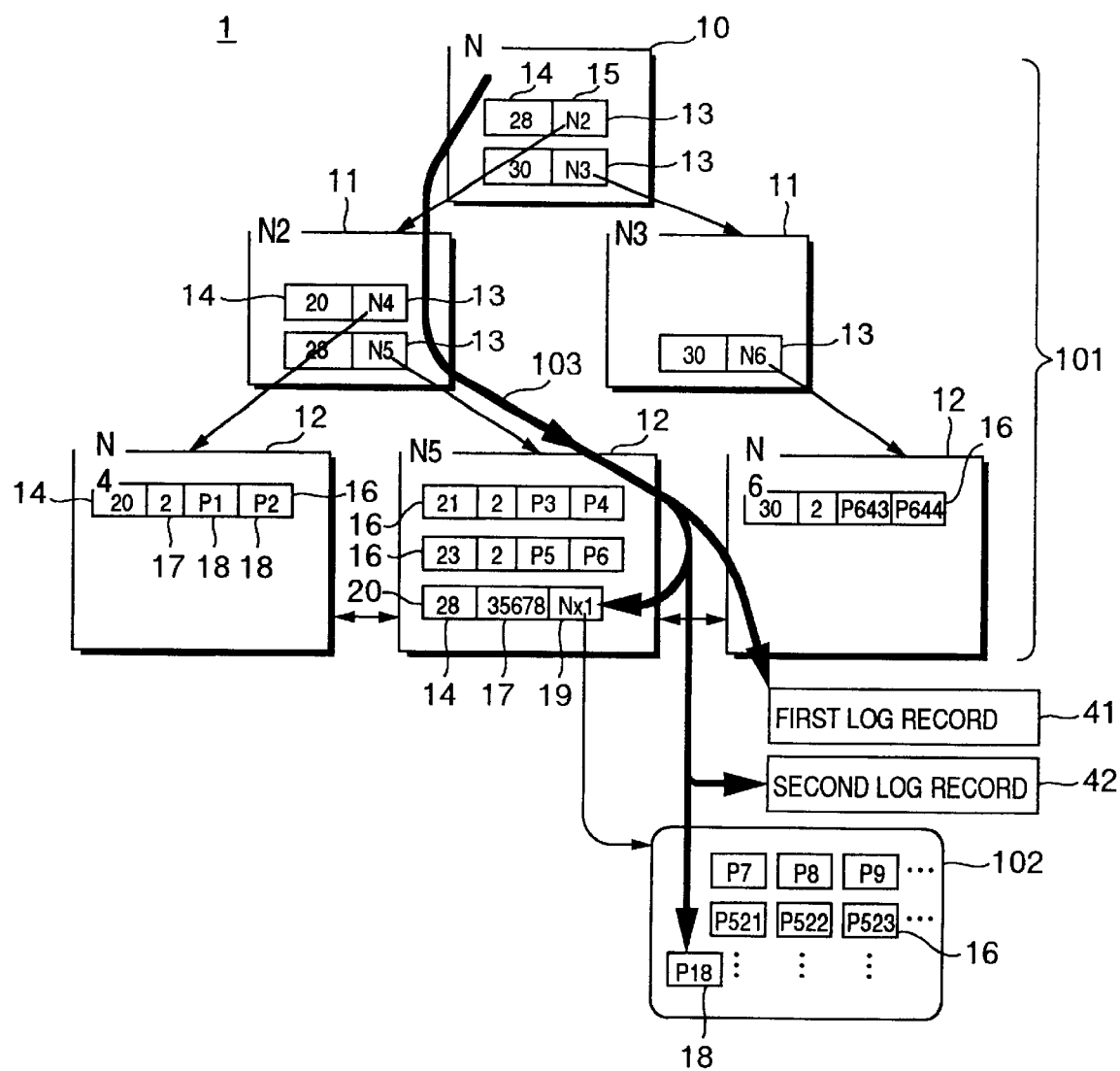
FIG. 1 shows a concept of the present invention.

The concept of the present invention will be briefly described first by referring to FIG. 1.

As shown in FIG. 1, a B-tree index 1 in the database management system according to the present embodiment comprises a B-tree structure 101 for efficiently obtaining information relating to table data using a key, and a data structure 102 (hereinafter referred to as a duplicate key data structure) for management of a large amount of table data information relating to a key.

The B-tree structure 101 comprises the root node 10, an intermediate node 11, and the leaf node 12, and contains a number of nodes at a number of levels from a root node. The root node 10 and the intermediate node 11 store the upper node 13 having the key 14 and the pointer 13 indicating a node to a lower level relating to the key value. In each node, the upper node 13 and the leaf entry 16 are stored and managed in the order of the key values of the upper nodes 13 and 16. In the present embodiment, the key values are stored in an ascending order from left to right as shown in FIG. 1. In each node, a necessary index entry can be accessed with efficiency and stability by performing a binary searching process on the sorted index entries. A child node pointed to by an upper index entry stores an index entry having a key value smaller than the key value of its upper index entry.

In the case where there are a large amount of table data relating to the key 14, a leaf entry 20 has the key 14, the number 17 of pieces of information about the table data relating to the key value, and a pointer 19 to the duplicate key data structure 102 storing information about table data. In the example shown in FIG. 1, the number of pieces of related table data information, that is, the number of duplication, relating to the key value '28' is '35,678'. The 35,678 pieces of information is stored and managed in the duplicate data structure 102 pointed to by a pointer 19 'N×1'.

On the other hand, when the number of pieces of information about the number of duplication, that is, the table data, is not large as in the example of the index entry other than the key value '28' as shown in FIG. 1, the entry is stored as the leaf entry 16 not having the duplicate key data structure 102. The leaf entry 16 comprises the key 14, the table data information 18 (data record identifier) relating to the key value, and the number 17 of pieces of the table data information 18 relating to the key value. If the value of duplication of the table data information relating to the key has exceeded a predetermined threshold when a data record if added or updated, control is passed to the leaf entry 20 pointing to the duplicate key data structure 102.

In addition, the duplicate key data structure 102 for storage and management of the information relating to a large number of table data has the following features:

(1) Simultaneous access can be gained in a plurality of processes without obtaining exclusive control for access.

(2) A canceling process can be performed without limiting access in a normal process.

Here, an arrow 103 indicates the key value '28' for the B-tree index 1 after the data record is updated, and the result of the process of adding and updating the table data relevant information 'P18'. In the adding/updating process, a searching operation is started using the key value '28' with the root node 10 (N1) of the B-tree structure 101. Then, the intermediate node 11 (N2) is searched, and the leaf node 12 (N5) storing the target leaf entry 20 having the key value '28' is finally searched. Then, the leaf entry 20 is confirmed, the first log record 41 is obtained, and the number 17 of duplication in the entry is incremented. The first log record 41 contains necessary information for continuing the updating process on the duplicate key data structure 102. Furthermore, the pointer 19 (N×1) to the duplicate key data structure 102 in the entry is obtained, and access to the duplicate key data structure 102 is gained. Then, a second log record 42 is obtained, and the table data relevant information 'P18' is added to the duplicate key data structure 102. The second log record 42 contains the information indicating that the table data relevant information 18 has been added to the duplicate key data structure 102.

The addition of the table data relevant information has been described above by referring to FIG. 1. Similarly, the table data relevant information can be deleted. That is, the leaf entry 20 is accessed, the first log record 41 is obtained, and the number 17 of duplication in the entry is decremented. Then, the duplicate key data structure 102 is accessed, the second log record is obtained, and then the table data relevant information 18 is deleted from the duplicate key data structure 102.

As described above, since the order of changing the duplicate key data structure is constant from the update of a leaf entry, and it is not necessary to exclusively control the data resources forming the B-tree index 1, the concurrent execution of a plurality of processes can be realized. Furthermore, although a canceling process is required on the results of a series of changing processes, or although an interrupting process is required immediately after a leaf entry has been updated, the above mentioned first log record 41 and second log record 42 can be used to perform the canceling process with the concurrent execution.

Practically, when the first log record 41 and the second log record 42 are obtained in a pair when a canceling process is performed, it is determined that a series of changing processes have been completed. In the example shown in FIG. 1, the key value '28' and the table data relevant information 'P18' are deleted. If only the first log record 41 has been obtained when a canceling process is performed, then only a changing process on the leaf entry 20 has been performed. Therefore, the table data relevant information 'P18' is added to a duplicate key data structure 201 using the information contained in the first log record, and then the key value '28' and the table data relevant information 'P18' are deleted again. In the canceling process, the order of changing the B-tree index 1 is constantly fixed, the concurrent execution with other processes can be guaranteed. As described above, the concurrent executability can be realized with a canceling process performed.

Furthermore, since the duplicate key data structure 201 is pointed to from the leaf entry 20, and the data is stored and managed outside the leaf node 12, a larger number of leaf entries having different keys can be stored in the leaf node 12 storing the leaf entry 20 than in the system in which all table data relevant information 18 is stored in the leaf entry 16. Then, the necessary number of leaf nodes 12 storing leaf entries can be limited, and the necessary number of the intermediate nodes 11 can be finally limited, thereby reducing the storage amount of the entire B-tree index. When access is gained to a key not having a large amount of table data information, the amount of the B-tree structure can be reduced, thereby providing stable performance for all retrieving and changing processes through the B-tree structure.

Figure 2:
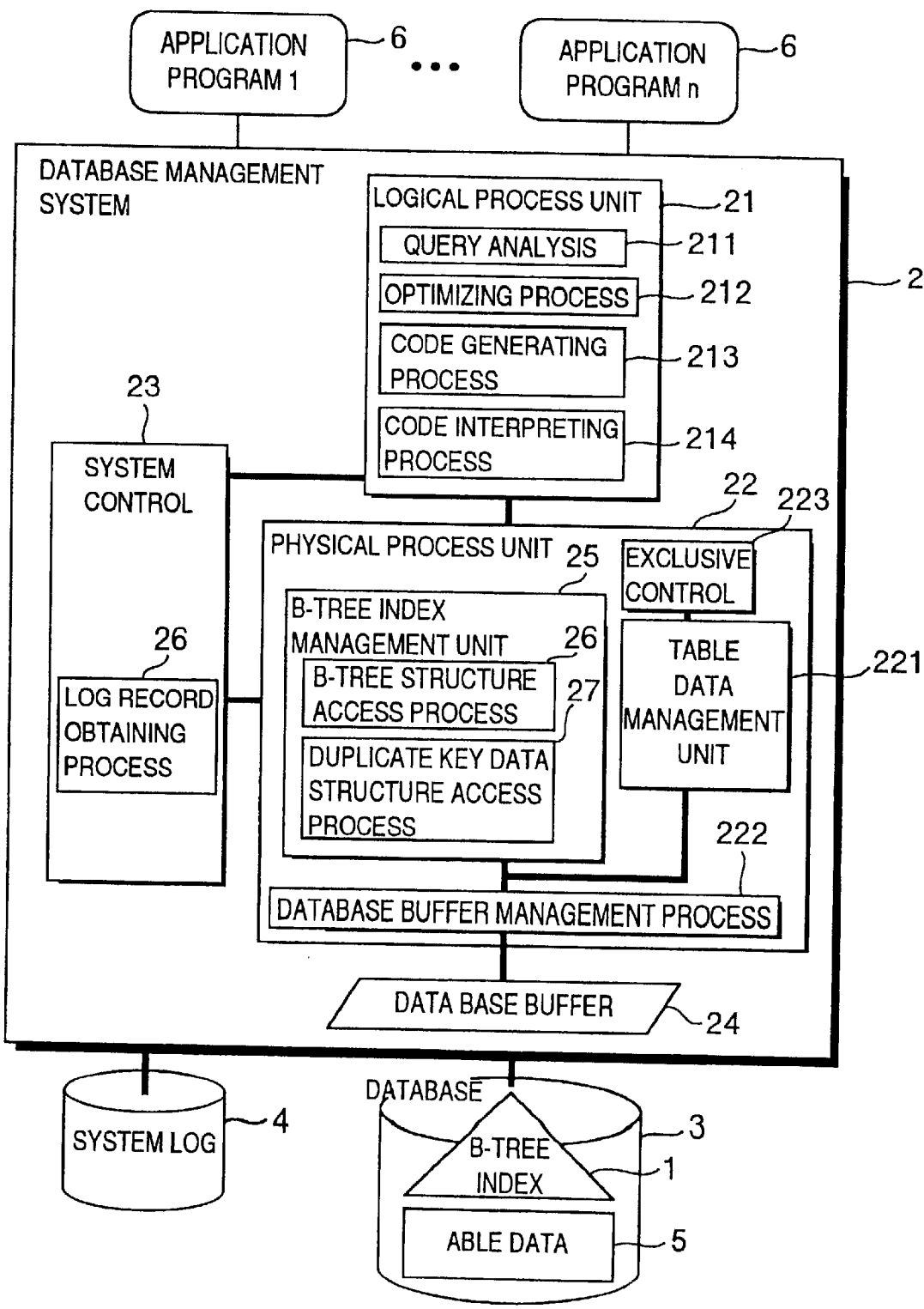
FIG. 2 is a block diagram of functions of a database process system containing a B-tree index according to the present embodiment.

FIG. 2 shows the outline of the configuration of the database management system according to the present embodiment. An application program 6 is generated by a user, and a database management system 2 manages the entire database system such as processing a query, managing resources, etc. The database management system 2 comprises a logical process unit 21, a physical process unit 22, a system control 23, a database 3 for continuously or temporarily storing data to be accessed in the database, and a system log 4. In addition, the database management system 2 is connected to another system through a network, etc.

The above mentioned logical process unit 21 comprises a query analysis 211 for performing syntax and semantic analyses on a query, an optimizing process 212 for generating an appropriate process procedure, and a code generating process 213 for generating a code corresponding to a process procedure. It further comprises a code interpreting process 214 for interpreting the code, and instructing the physical process unit 22 to process a database based upon the generated code described above.

The physical process unit 22 comprises a table data management 221 for performing storing, deleting, updating, and retrieving processes of data on table data 5 stored in the database 3 through a data base buffer 24. Furthermore, it comprises a B-tree index management unit 25 for managing the index 1 stored in the database 3. The index 1 comprises the B-tree structure for efficient access to the relevant information using a key, and a duplicate key data structure for management of a number of pieces of table data information relating to the key.

The B-tree index management unit 25 has the function of a B-tree structure access process 26 for performing a B-tree structure changing process on the B-tree index 1 relating to the table data 5 when the table data 5 is updated, and the function of a duplicate key data structure access process 27 for changing the duplicate key data structure. Furthermore, the B-tree index management unit 25 comprises in the B-tree structure access process 26 and the duplicate key data structure access process 27 the function of quickly retrieving the related table data from a key which is a retrieval condition by accessing the index 1.

The physical process unit 22 comprises an exclusive control 223 for controlling the resources shared in a system. According to the present embodiment, the consistency of data can be realized only by the exclusive control (exclusive resources: a table data storage page ID, a table data ID, etc.) of the table data 5, and no exclusive control is performed on the resources (an index ID, an index page ID, a key value, etc.) of the B-tree index 1.

The system log 4 accumulates the update history information by inserting, updating, deleting, etc. data in the database 3. The accumulated information contains the history information about the change made to the B-tree index 1. In various states such as the cancellation of a transaction, system failure, etc., the information is used to restore the consistency of the data of the B-tree index 1.

The system control 23 receives a query from a user, returns a query result, and maintains a database upon receipt of a command, etc. Furthermore, it manages the above mentioned system log 4, cooperates with the physical process unit 22, and performing a process 26 of obtaining a log record which is history information when the database 3 is changed. Then, the system control 23 passes the log record to the B-tree index management unit 25 of the physical process unit 22 when the read log record relates to the process of changing a B-tree index, and requests it to perform a canceling process. The requested B-tree index management unit 25 performs a change deleting process according to the information in the log record.

A user can search for, access, and change a data record forming the table data 5 in the database 3 using the database management system 2 through the application program 6. The database management system 2 uses the B-tree index 1 to realize efficient access to a data record.

The B-tree index 1 or the table data 5 in the database 3 can be accessed by reading (GET) it to the data base buffer 24 on an access basis, that is, on a page basis. After referring to (retrieving) a page in the buffer, it is declared that the use of the buffer has been completed by releasing (RELEASE) the buffer, and the buffer is allowed to be used by other processes. After updating a page in the buffer, the buffer is PUT to use. Thus, it is declared that the database reflects a page in the buffer, and the buffer is allowed to be used by other processes. The database is not immediately reflected by the page in the buffer, but can be reflected it by a certain trigger. The buffer is latched so that other transactions cannot illegally access the page got (GET) in the buffer. A latch is a kind of lock, but its effect continues for a shorter time than a normal lock, thereby obtaining and releasing the buffer at a lower cost. According to the present embodiment, a sharing latch is used when an index node is referred to, and an exclusive latch is applied when it is updated. The processes relating to the exclusive latch are serialized, and sharing latches allow the buffer to be simultaneously referred to. When the buffer is released, the obtained latch is released, and another process trying to obtain an exclusive latch is permitted to access the buffer.

Figure 3:
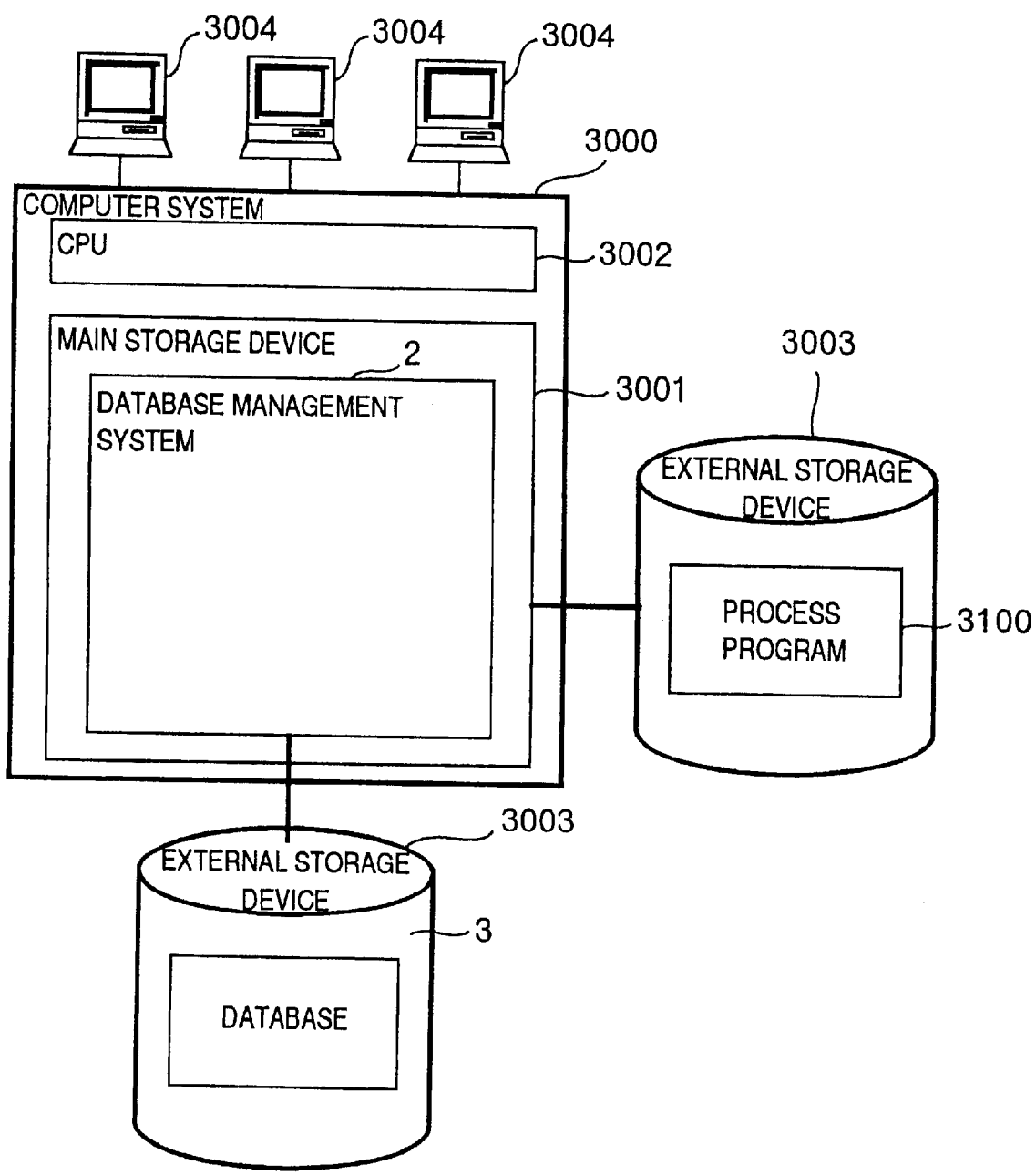
FIG. 3 shows an example of a hardware configuration of a computer system according to an embodiment of the present invention.

FIG. 3 shows an example of the configuration of the hardware of the computer system according to the present embodiment. A computer system 3000 comprises a CPU 3002, a main storage device 3001, an external storage device 3003 such as a magnetic disk device, etc., and a number of terminals 3004. The database management system 2 described above by referring to FIG. 2 is provided above the main storage device 3001, and the database 3 containing the table data 5 and the index 1 managed by the database 3 is stored in the external storage device 3003. The system log 4 is also stored in the external storage device 3003. Furthermore, a program 3100 realizing the database management system 2 is stored in the external storage device 3003.

Figure 8A:
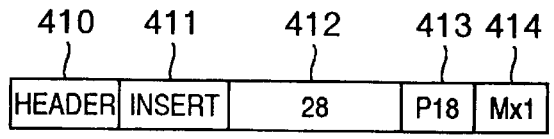
FIG. 8A shows an example of a first log record in the B-tree index according to an embodiment of the present invention.
Figure 8B:
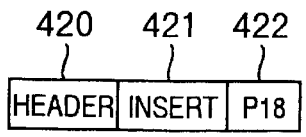
FIG. 8B shows an example of a second log record in the B-tree index according to an embodiment of the present invention.

FIGS. 8A and 8B show an example of a log record of an index according to the present embodiment.

As shown in FIG. 8A, the first log record 41 obtained when a leaf entry is changed as described by referring to FIG. 1 comprises a log record header 410 containing information about a transaction to which the changing process belongs, etc., an operation code 411 indicating a change, a key 412, table data information 413 to be changed, and a pointer 414 to the duplicate key data structure indicated by a changed leaf entry. A code indicating an adding process, a deleting process, etc. is set in the operation code 411. In the example shown in FIG. 8A, the set code is 'INSERT' indicating an adding process. The log record header 410 also contains area information storing the index ID of a B-tree index to be changed, and the index. The value set in the key 412 is equal to the value of the key 14 in the leaf entry 20 to be changed. In the example shown in FIG. 8A, the value is '28'.

The pointer 414 to a duplicate key data structure refers to information for continuing a process of changing the duplicate key data structure when a leaf entry is changed, the duplicate key data structure is not completely changed, and the change result has to be canceled.

As shown by 42 in FIG. 8B, the second log record obtained when a leaf entry is changed as described above by referring to FIG. 1 comprises a log record header 420 including the information about a transaction to which the changing process belongs, etc., an operation code 421 indicating a change, and a table data information 422 to be changed. Like the operation code 411, a value indicating an adding process and a deleting process is set to the operation code 421. In the example shown in FIG. 8B, the set code is 'INSERT' indicating an adding process. In the table data information 422, the value of the table data information 413 of the first log record 41 is set. The second log record 42 functions as a marker indicating whether or not the changing process has been completed on the duplicate key data structure 201 as described above by referring to FIG. 1.

Figure 4:
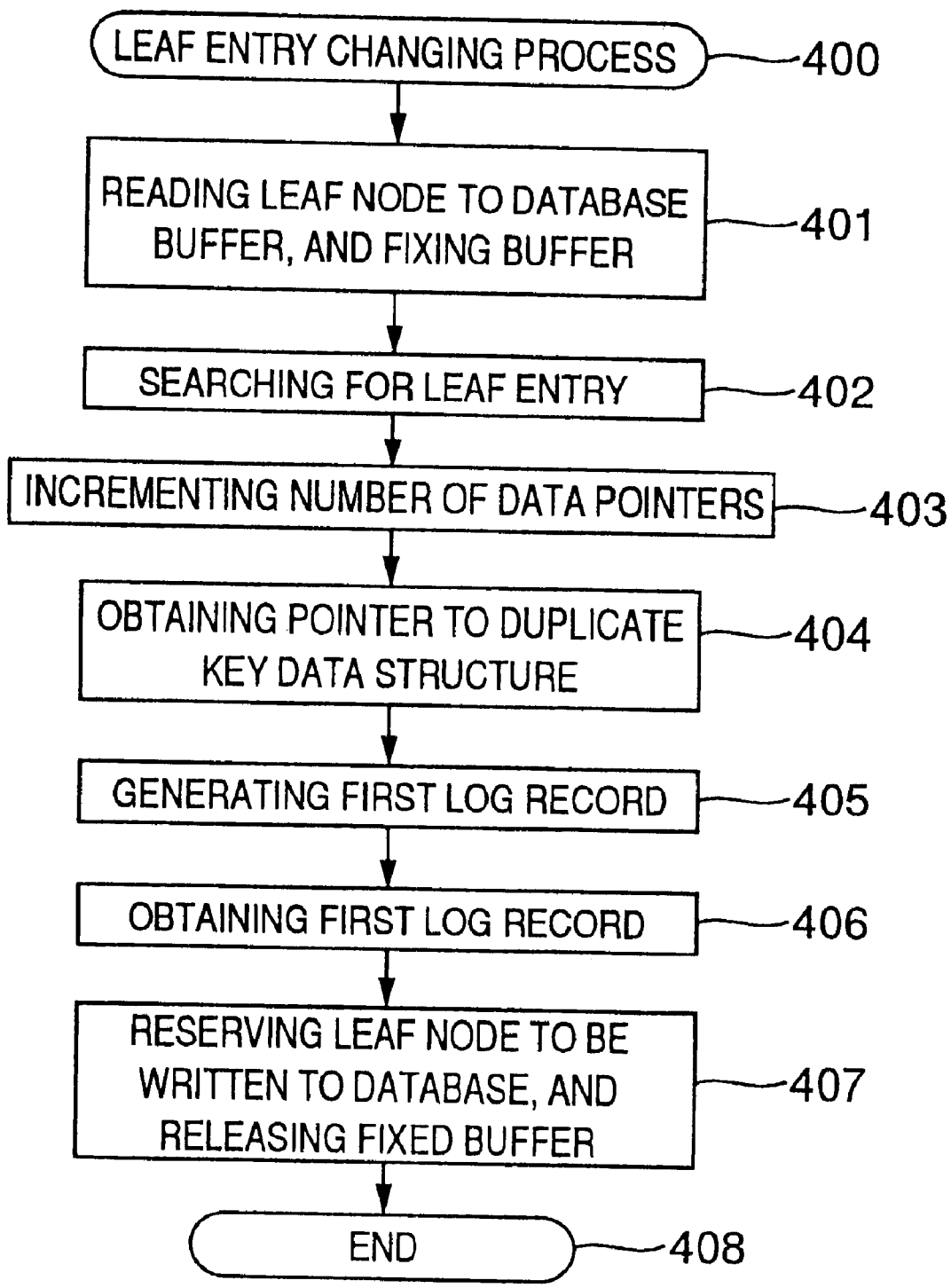
FIG. 4 is a flowchart of a process procedure of an index updating process of a B-tree index management unit 25 according to an embodiment of the present invention.

FIG. 4 is a flowchart of the process procedure of the B-tree index management unit 25 according to the present embodiment. FIG. 4 shows the contents of the B-tree structure access process 26 performed when table data information is added to the B-tree index.

First, in step 401, the B-tree structure is searched from the root node to upper nodes, and after confirming the leaf node, the leaf node is read to a database buffer, and the buffer is fixed (GET). Then in step 402, a leaf entry stored in a leaf node is searched to confirm the leaf entry to be changed. In step 403, the number of pieces of table data information (number of duplication) relating to the key of the leaf entry is incremented. In step 404, the pointer to the duplicate key data structure contained in the leaf entry is obtained. Furthermore, the first log record 41 described by referring to FIG. 8A is generated (step 405), and the generated first log record 41 is obtained (step 406). Finally, the leaf node is reserved to be written to the database, and the fixed buffer is released (PUT) (step 407). Thus, the leaf entry changing process is completed (step 408), and then the process of changing the duplicate key data structure is performed.

In the flowchart, the process is performed by changing a leaf entry (404), and obtaining a log record (405), but the database actually reflects the change result of the leaf node only after a log record has been written to the system log according to the WAL (write ahead log) protocol.

Figure 5:
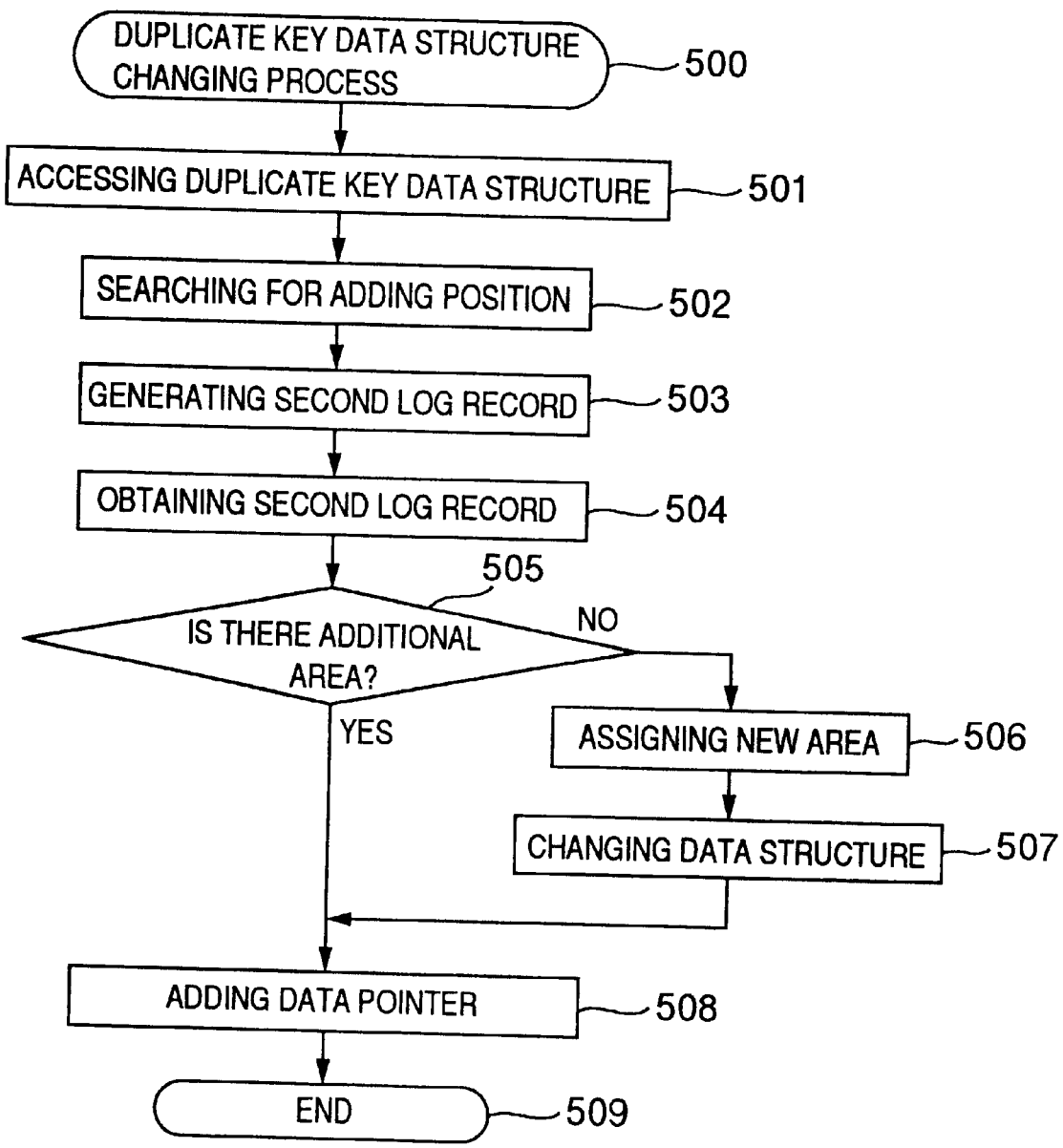
FIG. 5 is another flowchart of the process procedure of the index updating process of the B-tree index management unit 25 according to an embodiment of the present invention.

FIG. 5 is a flowchart of the process procedure of the B-tree index management unit 25 according to the present embodiment. FIG. 5 shows the contents of the duplicate key data structure access process 27 performed when the table data information is added to the B-tree index.

The process of changing the duplicate key data structure is performed successively after the process of changing the leaf entry as described above by referring to the flowchart shown in FIG. 4.

In step 501, the duplicate key data structure 201 is accessed using the pointer obtained in step 404 shown in FIG. 4, and the position to which the table data information is added is searched in step 502. Then, the second log record described above by referring to FIG. 8B is generated (step 503) to obtain the generated second log record (step 504). Then, it is determined whether or not there is an additional area in the duplicate key data structure (step 505). When there are no additional areas, control is passed to step 506, a new area is assigned, and the duplicate key data structure is changed after the new area is added (step 507). Practically, when the duplicate key data structure comprises a plurality of pages, a new page is assigned. Then, control is passed to step 508. In addition when step 505 determines that there are additional areas, the control is passed to step 508, then the table data information is added to the duplicate key data structure, and the process of changing the duplicate key data structure terminates (step 509).

Figure 6:
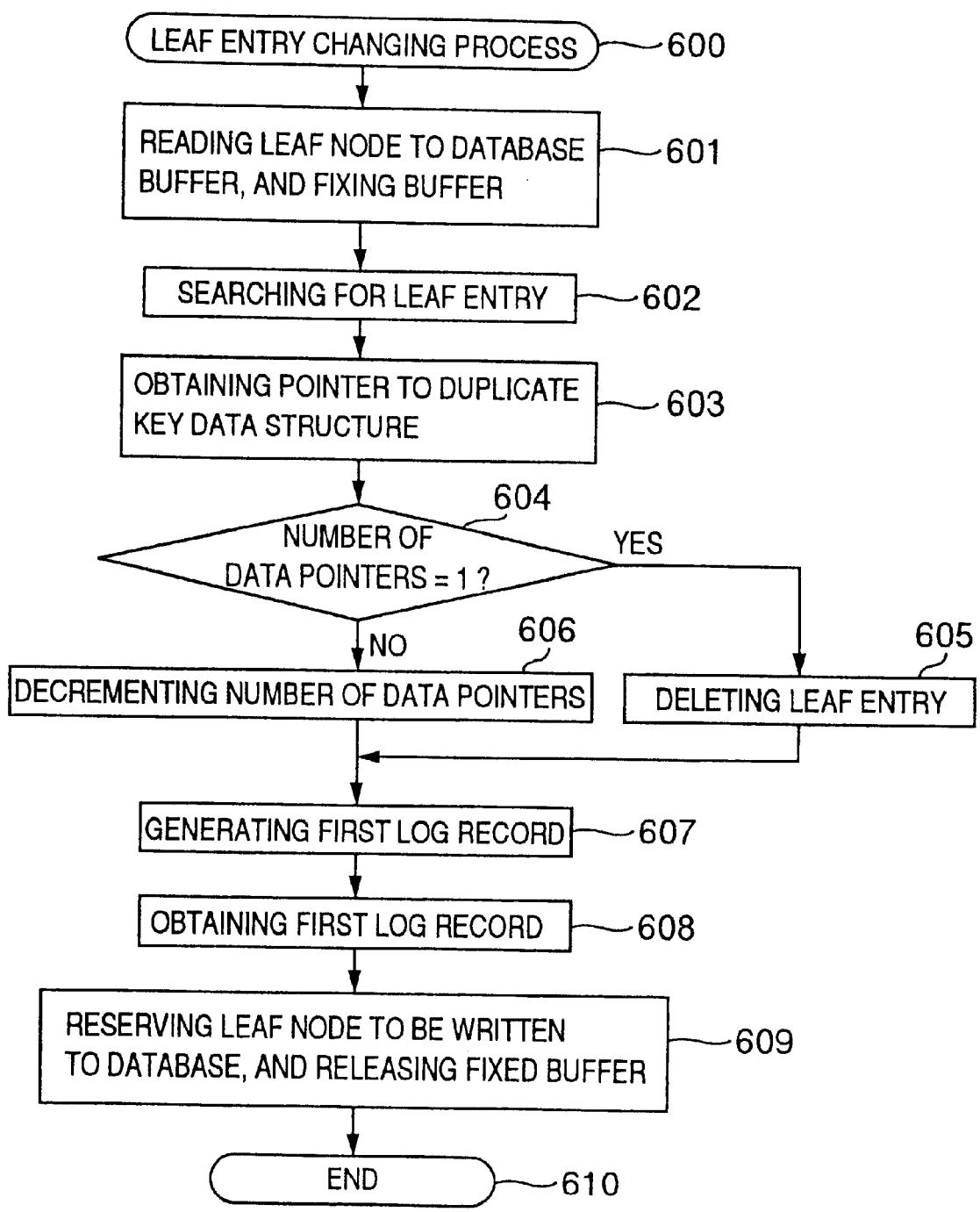
FIG. 6 is a further flowchart of the process procedure of the index updating process of the B-tree index management unit 25 according to an embodiment of the present invention.

FIG. 6 is a flowchart of the process procedure of the B-tree index management unit 25 according to the present embodiment. FIG. 6 shows the contents of the B-tree structure access process 26 performed when the table data information is deleted from the B-tree index.

First, in step 601, the B-tree structure is searched from the root node to upper nodes, and after confirming the leaf node, the leaf node is read to the database buffer, and the buffer is fixed (GET). Then in step 602, a leaf entry stored in a leaf node is searched to confirm the leaf entry to be changed. In step 603, a pointer to the duplicate key data structure in the leaf entry is obtained. Then, in step 604, it is determined whether or not the number of pieces of table data information (number of duplication) relating to the key of the leaf entry is 1. When the number of duplication is 1, control is passed to step 605, the leaf entry is deleted, and control is passed to step 607. If the determination result in step 604, that is, the number of duplication, is larger than 1, then control is passed to step 606, and the number of table data information (number of duplication) relating to the key of the leaf entry is decremented.

Furthermore, the first log record described above by referring to FIG. 8A is generated (step 607), and the generated first log record 41 is obtained (step 608). Finally, the leaf node is reserved to written to the database, and the fixed buffer is released (PUT) (step 609). Thus, the leaf entry changing process terminates (step 610), and control is successively passed to the process of changing the duplicate key data structure.

Figure 7:
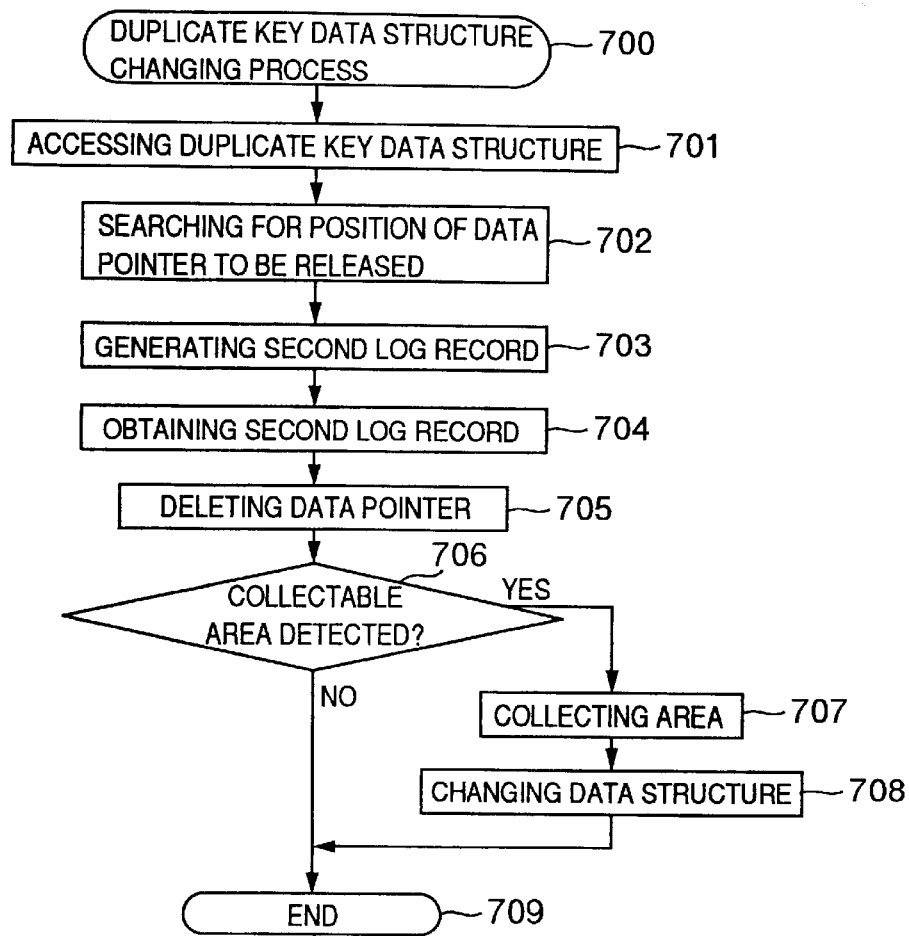
FIG. 7 is a further flowchart of the process procedure of the index updating process of the B-tree index management unit 25 according to an embodiment of the present invention.

FIG. 7 is a flowchart of the process procedure of the B-tree index management unit 25 according to the present embodiment. FIG. 7 shows the contents of the duplicate key data structure access process 27 performed when the table data information is deleted from the B-tree index.

The process of changing the duplicate key data structure is performed successively after the process of changing the leaf entry described by referring to the flowchart shown in FIG. 6.

First, in step 701, the duplicate key data structure is first accessed using the pointer obtained in step 603 shown in FIG. 4. In step 702, the position of the table data information to be deleted is searched for. Then, the second log record described above by referring to FIG. 8B is generated (step 703), and the generated second log record is obtained (step 704).

Then, in step 705, the table data information is deleted from the duplicate key data structure. By deleting the table data information, it is determined whether or not there is an area in which a collectable duplicate key data structure can be configured (step 706). If it is determined that a collectable area has been detected as a determination result, control is passed to step 707, the area is collected, and the duplicate key data structure accompanying with the area collection is changed (step 708). Practically, when the duplicate key data structure 201 comprises a plurality of pages, the pages are collected. The collected pages are reused by assigning a new page in another process. In step 709 after step 708, the process of changing the duplicate key data structure terminates. When the determination result in step 706 indicates no collectable areas, the process of changing the duplicate key data structure terminates in step 709 as it is.

Figure 9:
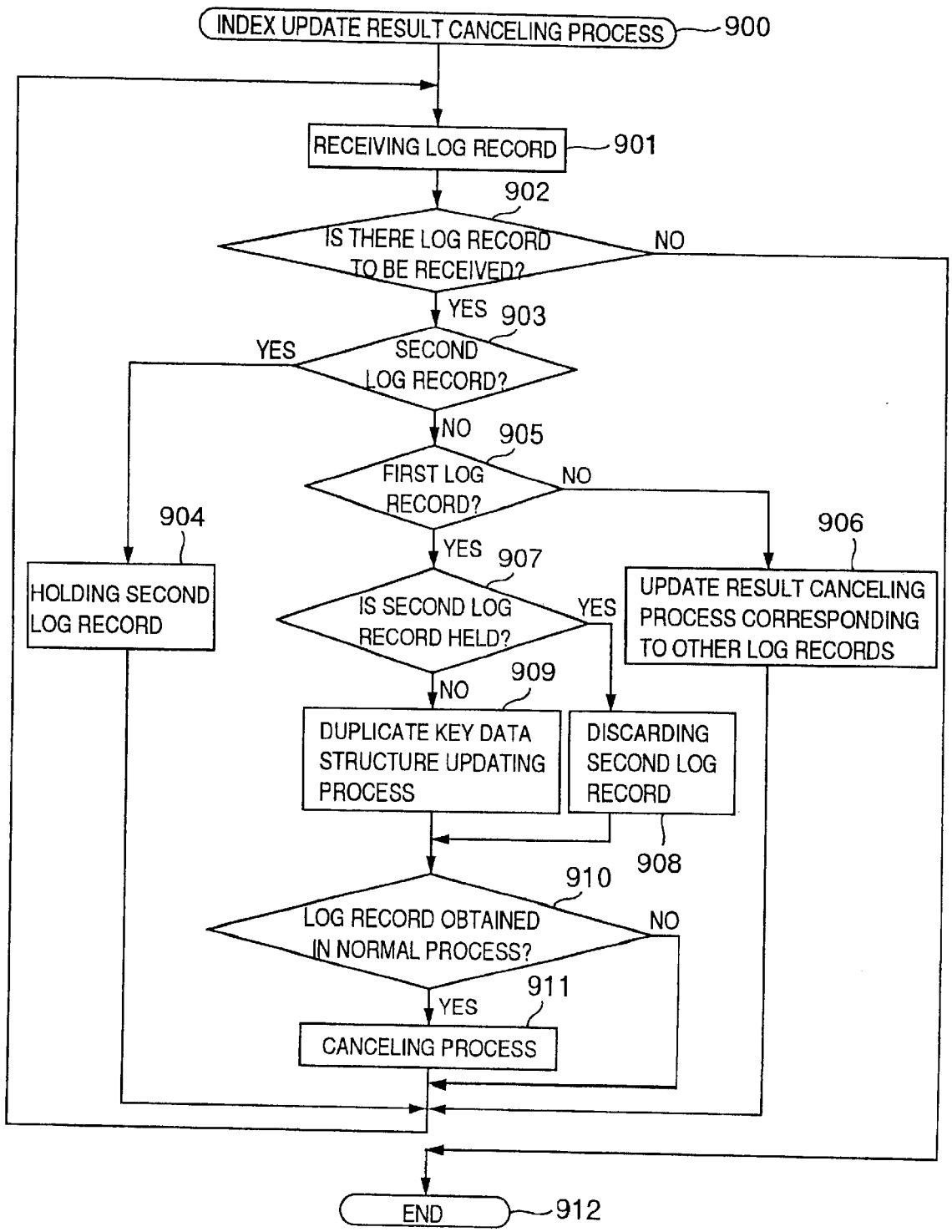
FIG. 9 is a flowchart of the process procedure of an index update result canceling process (recovery process procedure) of the B-tree index management unit according to an embodiment of the present invention.

FIG. 9 is a flowchart of the process procedure of canceling the index update result of the index management unit according to the present embodiment.

First, in step 901, a log record relating to a change of a B-tree index is received from system control. In step 902, it is determined whether or not there is a log record to be processed. If there are no log records to be processed, the process of canceling an index update result terminates. If there is a log record to be processed, that is, if there is a log record to be received, then control is passed to step 903, and the type of log record is determined. First, it is determined whether the log record is the second log record (step 903). If it is the second log record, then control is passed to step 904, and the second log record is held. Then, control is returned to 901, and the process is performed on the subsequent log record. The subsequent log record should be the first log record. If it is determined that the log record is not the first log record in the determination in step 903, then it is further determined in step 905 whether or not the log record is the first log record. If the log record is not the first log record, then the process of canceling the update result corresponding to another log record is performed in step 906, control is returned to step 901, and the subsequent log record is processed. If the log record is the first log record, the following process is performed. First, it is determined whether or not the second log record is held (step 907). If it is held, it is determined that a series of changing processes for the leaf entry and the duplicate key data structure have been completed, the held second log record is discarded (step 908), and control is passed to step 910. If the second log record is not held, the, it is determined that the leaf entry changing process has been completed, but the corresponding duplicate key data structure changing process has not been completed, and the duplicate key data structure changing process continues in step 909. Then, control is passed to step 910. In step 910, it is determined whether or not the log record being processed has been obtained in a normal process. If the log record has been obtained in a normal process, then it is necessary to cancel the related change result. The canceling process is performed in step 911. When the log record is not obtained in the normal process, that is, when the log record is obtained in the canceling process, it is determined that the canceling process has been completed including step 909, the process of canceling a series of B-tree index update results terminates, control is returned to step 901, and the subsequent log record is processed.

Figure 10:
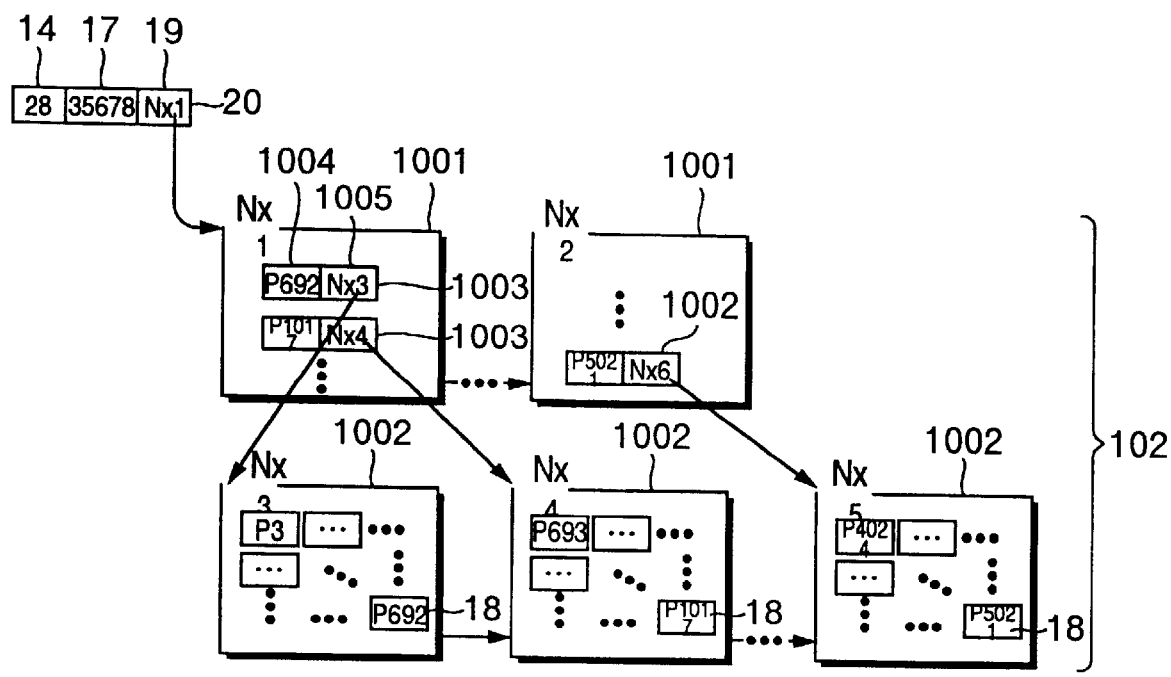
FIG. 10 shows an example of the configuration of the duplicate key data structure according to the present embodiment.
Figure 11:
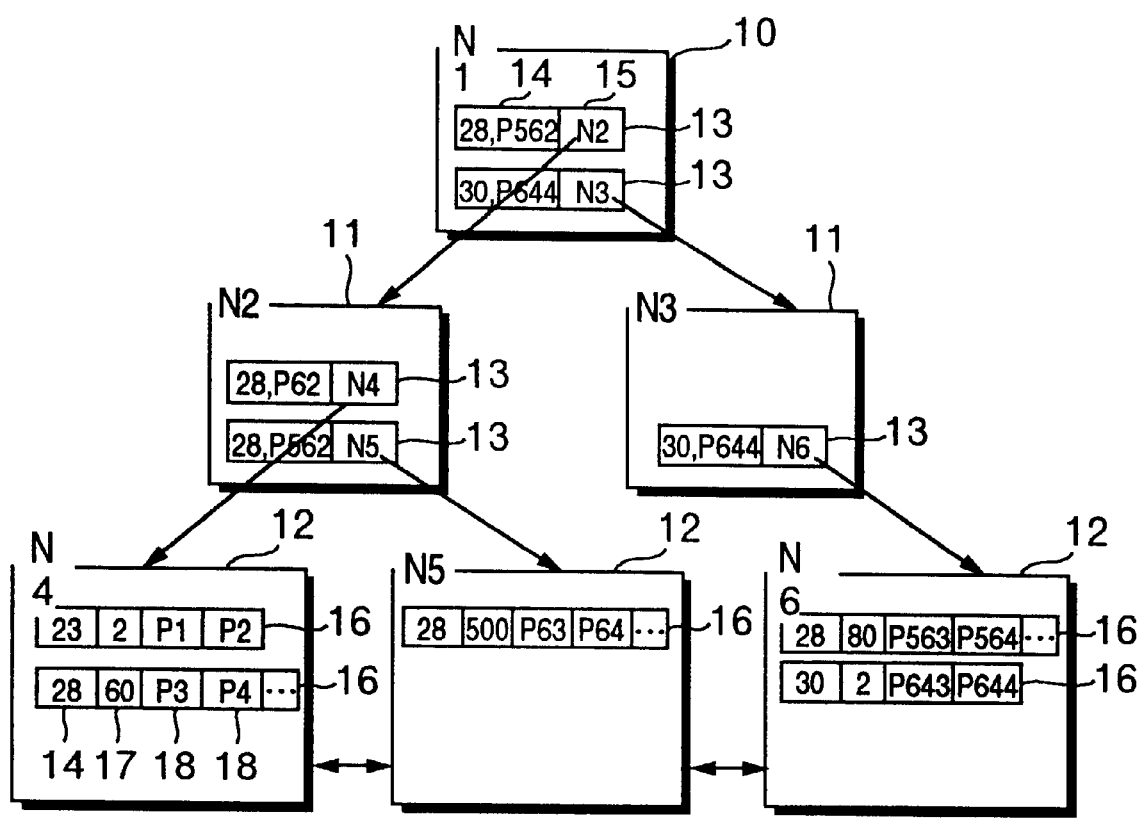
FIG. 11 shows the configuration of a conventional B-tree index having many duplicate key data.

FIG. 10 shows an example of the configuration of the duplicate key data structure 102 according to the present embodiment.

In the example shown in FIG. 10, the duplicate key data structure 102 comprises a page 1002 actually storing table data information, and a page 1001 storing a management entry 1003 having a pointer to the page 1002.

The management entry 1003 stored in the page 1001 comprises a pointer 1005 pointing to the page 1002, and a maximum value 1004 of the table data information stored in the page 1002. The management entry 1003 in the page 1001 is sorted in order from the maximum value 1004 of the table data information.

As shown in FIG. 10, each page 1001 has a pointer to the page 1001 storing a management entry having the maximum information larger than the maximum value 1004 in the management entry 1003 stored in the page 1001. From the leaf entry 20, the page 1001 storing the management entry pointing to the page 1002 containing the minimum table data information is pointed to.

With the above mentioned data structure, the duplicate key data structure can be efficiently searched as described above by referring to FIGS. 5 through 7.

The page 1001 or 1002 can be newly assigned or collected easily by GETting or PUTting a database buffer. The second log record used in the newly assigning and collecting process can be provided with a page identifier of the page 1001 or 1002 in addition to the configuration information indicated by the example shown in FIG. 8B to be easily processed in a change continuing process.

The process of the flowchart is performed based on the program in the computer system as the example shown in FIG. 3. However, the program is not limited to a program stored in an external storage device connected physically directly to a computer system as indicated by the example shown in 3. That is, the program can be stored in a computer-readable storage medium such as a hard disk device, a floppy disk device, etc. In addition, it can also be stored in an external storage device connected to a computer system other than the computer system shown in FIG. 3 through a network.

With the configuration, the table data information having the same keys can be simultaneously accessed by a plurality of processes without obtaining exclusive control for access, and can be managed in a duplicate key data structure in which a canceling process can be performed without limiting access by a normal process. As a result, the concurrent execution can be performed including a canceling process on a plurality of processes simultaneously accessing the same key.

The duplicate key data structure is pointed to by a leaf entry, and stored and managed outside a leaf node. Therefore, leaf entries having a larger number of duplicate keys can be stored in a leaf node in which leaf entries having duplicate keys are stored. As a result, a B-tree index requires a smaller storage capacity, thereby providing stable access performance.

As described above, the concurrent execution can be realized even if there are a number of duplicate keys, and a data management method can be provided using a B-tree index having high storage efficiency.

The data management method using a B-tree index is effective for an application in which a B-tree index is used for data having a smaller range of values such as a 'work transition state' in a work flow, etc. In the B-tree index used in the application, the number of duplication of data relating to one key is very large because the range of values is small, an updating process is frequently performed on the B-tree index each time the 'work transition state', etc. changes.

The B-tree has been described above, but the present invention provides a data management method and apparatus which can be applied to a case where index access is tried for the same keys in an environment in which plural accessing processes are performed, and can appropriately perform index access for the same keys.

The present invention can provide a data management method and apparatus which appropriately perform index access for the same keys in an environment in which plural accessing processes are performed.

What is claimed is:

1. A data management method using a B-tree index for managing identification information relating to data containing a key as a data pointer, and for finding a data pointer relating to the key based on a key value, said method having a data structure with which a plurality of data pointers relating to a key are stored, which is different from that of a leaf node storing an index entry containing the key, and in which data can be pointed to from an index entry containing the key to realize concurrent access in a plurality of processes, and comprising the steps of:

when a data pointer relating to a key is added or deleted, obtaining a first log record containing information about adding or deleting a data pointer to or from the data structure storing the plurality of data pointers relating to the key;

updating an index entry containing the key stored in a leaf node;

obtaining a second log record containing information that the data pointer has been added or deleted to or from the data structure; and adding or deleting the data pointer to or from the data structure, and when a result of a process in which the data pointer is added or deleted is canceled, determining whether or not the data pointer has been added or deleted to or from the data structure by using information in the second log record; and adding or deleting the data pointer to or from the data structure according to information in the first log record if it is determined that the pointer has not been added or deleted to or from the data structure.

2. The method according to claim 1, wherein said first log record contains, as information for addition or deletion of the data pointer, a data pointer and a pointer to a data structure already storing or to store the data pointer.

3. The method according to claim 1, wherein a step of updating an index entry containing the key stored in a leaf node increases a number of data pointers relating to the key contained in the index entry when a data pointer is added, and, when a data pointer is deleted, deletes or sets a deletion state of the index entry if a deletion result indicates no data pointer relating to the key, and decreases the number of data pointers if the deletion result indicates another data pointer relating to the key.

4. The method according to claim 1, wherein a data structure storing a plurality of data pointers relating a key is accessed without obtaining exclusive control of the key, a leaf node, or any resources configuring the data structure.

5. The method according to claim 1, wherein:

said data structure is configured by a plurality of nodes; and a data pointer is added or deleted to or from the data structure storing a plurality of data pointers relating to the key with a new node assigned or an existing node collected.

6. A data process system using a B-tree index for managing identification information relating to data containing a key as a data pointer, and for finding a data pointer relating to the key based on a key value, comprising:

storage means for storing a data structure with which a plurality of data pointers relating to a key are stored, which is different from that of a leaf node storing an index entry containing the key, and in which data can be pointed to from an index entry containing the key to realize concurrent access in a plurality of processes;

means for obtaining a first log record containing information about adding or deleting a data pointer to or from the data structure storing the plurality of data pointers relating to the key when a data pointer relating to a key is added or deleted;

means for updating an index entry containing the key stored in a leaf node;

means for obtaining a second log record containing information that the data pointer has been added or deleted to or from the data structure;

means for adding or deleting the data pointer to or from the data structure;

means for determining according to information in the second log record whether or not the data pointer has been added or deleted to or from the data structure when a result of a process in which the data pointer is added or deleted is canceled; and means for adding or deleting the data pointer to or from the data structure according to information in the first log record if it is determined that the pointer has not been added or deleted to or from the data structure.

7. The system according to claim 6, wherein said first log record contains, as information for addition or deletion of the data pointer, a data pointer and a pointer to a data structure already storing or to store the data pointer.

8. The system according to claim 6, wherein means for updating an index entry containing the key stored in a leaf node increases a number of data pointers relating to the key contained in the index entry when a data pointer is added, and, when a data pointer is deleted, deletes or sets a deletion state of the index entry if a deletion result indicates no data pointer relating to the key, and decreases the number of data pointers if the deletion result indicates another data pointer relating to the key.

9. The method according to claim 6, wherein a data structure storing a plurality of data pointers relating a key is accessed without obtaining exclusive control of the key, a leaf node, or any resources configuring the data structure.

10. The system according to claim 6, wherein said data structure is configured by a plurality of nodes, and a data pointer is added or deleted to or from the data structure storing a plurality of data pointers relating to the key with a new node assigned or an existing node collected.

11. A computer-readable storage medium storing a data management program using a B-tree index for managing identification information relating to data containing a key as a data pointer, and for finding a data pointer relating to the key based on a key value, said program having a data structure with which a plurality of data pointers relating to a key are stored, which is different from that of a leaf node storing an index entry containing the key, and in which data can be pointed to from an index entry containing the key to realize concurrent access in a plurality of processes, and comprising the steps of:

when a data pointer relating to a key is added or deleted, obtaining a first log record containing information about adding or deleting a data pointer to or from the data structure storing the plurality of data pointers relating to the key;

updating an index entry containing the key stored in a leaf node;

obtaining a second log record containing information that the data pointer has been added or deleted to or from the data structure; and adding or deleting the data pointer to or from the data structure, and when a result of a process in which the data pointer is added or deleted is canceled, determining according to information in the second log record whether or not the data pointer has been added or deleted to or from the data structure; and adding or deleting the data pointer to or from the data structure according to information in the first log record if it is determined that the pointer has not been added or deleted to or from the data structure.

12. A data process program using a B-tree index for managing identification information relating to data containing a key as a data pointer, and for finding a data pointer relating to the key based on a key value, said program having a data structure with which a plurality of data pointers relating to a key are stored, which is different from that of a leaf node storing an index entry containing the key, and in which data can be pointed to from an index entry containing the key to realize concurrent access in a plurality of processes, and comprising the steps of:

when a data pointer relating to a key is added or deleted, obtaining a first log record containing information about adding or deleting a data pointer to or from the data structure storing the plurality of data pointers relating to the key;

updating an index entry containing the key stored in a leaf node;

obtaining a second log record containing information that the data pointer has been added or deleted to or from the data structure; and adding or deleting the data pointer to or from the data structure, and when a result of a process in which the data pointer is added or deleted is canceled, determining according to information in the second log record whether or not the data pointer has been added or deleted to or from the data structure; and adding or deleting the data pointer to or from the data structure according to information in the first log record if it is determined that the pointer has not been added or deleted to or from the data structure.

* * * * *